No. 860,992. PATENTED JULY 23, 1907.
F. RICHARDSON.
CARPET STRETCHER.
APPLICATION FILED OCT. 8, 1904.
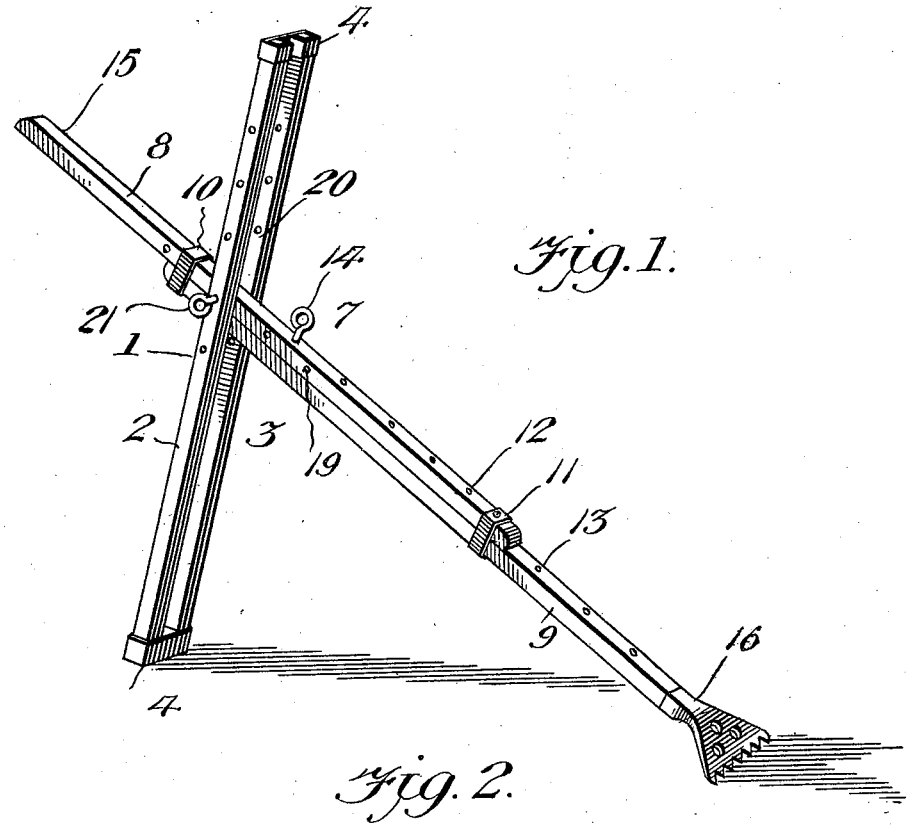
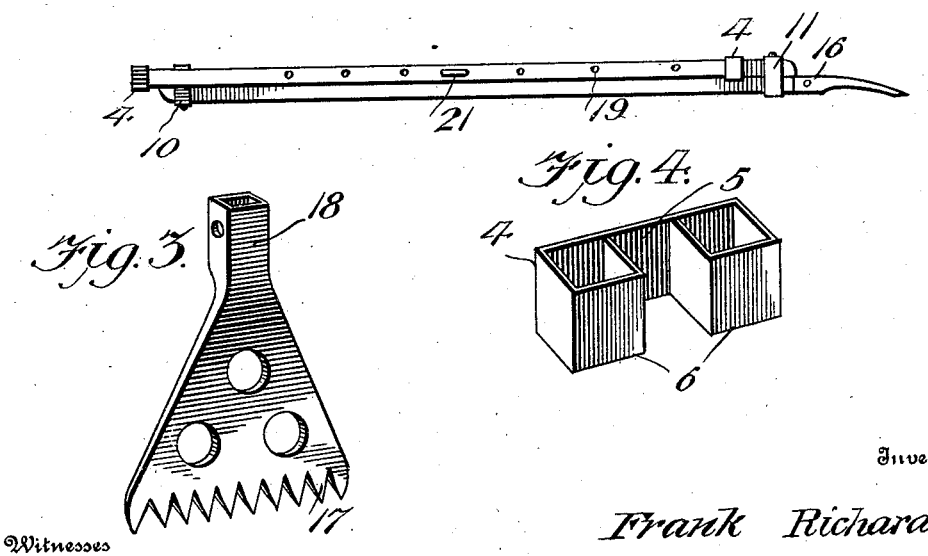
Witnesses
Geo. Ackman Jr.
C. C. Hines.
Inventor
Frank Richardson,
By Victor J. Evans
Attorney

UNITED STATES PATENT OFFICE.

FRANK RICHARDSON, OF FARMINGTON, MISSOURI.

CARPET-STRETCHER.

No. 860,992.  Specification of Letters Patent.  Patented July 23, 1907.

Application filed October 8, 1904. Serial No. 227,659.

*To all whom it may concern:*

Be it known that I, FRANK RICHARDSON, a citizen of the United States, residing at Farmington, in the county of St. Francois and State of Missouri, have invented new and useful Improvements in Carpet-Stretchers, of which the following is a specification.

My invention relates to improvements in carpet stretchers, its object being to provide a device of this character which is simple of construction, efficient in use and inexpensive of production and which is readily and conveniently adjustable to adapt it to stretch carpets for rooms of different sizes and to adjust and hold for tacking comparatively long strips or sections of carpet.

Another object is to provide a stretcher which may be packed in close compass for storage or transportation.

With these and other objects in view, the invention consists of the features of construction, combination and arrangement of parts hereinafter fully described and claimed, reference being had to the accompanying drawings, in which:—

Figure 1 is a perspective view of my improved carpet stretcher with the parts assembled and arranged in position for use; Fig. 2 is a plan view showing the sections of the handles folded or closed together to adapt the stretcher to be packed in close compass with its standard for storage or transportation; Fig. 3 is a perspective view of the claw or toothed triangular plate; and Fig. 4 is a view of one of the couplings for connecting the ends of the parallel bars composing the supporting standard.

Referring now more particularly to the drawings, the numeral 1 denotes a supporting standard comprising spaced parallel bars 2 and 3 connected at their opposite ends by unions or couplings 4. Each union or coupling 4, as shown in Fig. 4, comprises a body plate 5 bearing upon one of its sides spaced sockets or receptacles 6 adapted to receive the ends or extremities of the bars 2 and 3 and hold them in assembled relation. These couplings may be held in place by frictional contact with the ends of the bars or may be adjustably secured thereon by any preferred form of fastening.

An operating handle or thrust bar 7 is employed in connection with the standard 2 and comprises two bars or sections 8 and 9 which are slidably connected to make the handle adjustable as to length to suit different conditions of service. As shown, the respective lower and upper or inner and outer ends of said bars 8 and 9 are provided with sleeves 10 and 11 fastened thereto and adapted to receive the other sections, so that the sections are held in parallel relation and slidably connected together. In the sections are formed series of openings 12 and 13 for the reception of a pin 14 adapted to be passed down through one of the openings 12 and a registering opening 13 to connect and hold the bars from relative movement when adjusted to the desired position. The handle extends through the space between the two bars 2 and 3 of the standard 1, and the outer end of the bar 8 is provided with a suitable grasping portion 15, while the outer or lower end of the bar 9 carries a claw 16 to engage the strip of carpet which is to be stretched and hold it in stretched position while it is being tacked to the floor or surface. This claw preferably consists of a substantially triangular plate curved longitudinally and provided at its base with spurs or prongs 17 and at its vertex with a socket 18 to receive the end of the bar 9, which is fastened therein by any approved character of connection. The bar 8 is provided with transverse apertures or holes 19, and the bars 2 and 3 of the standard 1 are provided with similar apertures or holes 20, and through these apertures a pin 21 is adapted to be passed to pivotally connect the handle to the standard and secure the same in properly adjusted position.

In the operation of stretching a strip or piece of carpet the standard 1 is placed in an upright position, as shown in Fig. 1, and the handle 7 is connected therewith by the pin 21 after the bars or sections 8 and 9 thereof have been adjusted to the desired position to make the handle of requisite length to operate upon the strip of carpet which is to be stretched. The handle 7 is then drawn back and the claw 16 engaged with the strip or piece of carpet and rocked upon the standard 1 as a fulcrum, a forward movement being imparted thereto after the claw has been engaged with the carpet to stretch the carpet to the desired tension, after which the parts are retained in their adjusted position until the strip of carpet is tacked or otherwise fixed to the floor. This operation is carried out successively upon various portions or strips of the carpet until the entire carpet is stretched and secured, after which the parts of the stretcher are disassembled by withdrawing the pin 21 to disconnect the handle and standard, then withdrawing the pin 4 and sliding the bars 8 and 9 of the handle together until they are closed, as shown in Fig. 2, then applying the pin 14 to hold the said bars of the handle in fixed relation, and finally securing the handle to the standard 1 to hold the parts of the stretcher in coupled relation and in such close compass that they may be packed and stored with facility.

It will be observed that the form of the unions 4 is such as to enable the handle when the bars 8 and 9 are closed to be slipped down between the bars 2 and 3 of the standard 1 and fastened by the pin 21, and that this operation of assembling the parts for storage may, if desired, be accomplished without first detaching the handle from the standard, as, after the bars 8 and 9 have been slid together to decrease the length of the handle 7, the latter may be swung on the pin 21 as a pivot between the bars 2 and 3 and there held until it is desired to employ the device again. This operation of assembling the parts by swinging movement of the handle upon the standard may be facilitated by mounting the couplings or unions 4 in such manner that the spaces between their sockets 6 open upon opposite sides of the standard 1, so that when folding the handle upon the standard it will simply be necessary first to slide the bars 8 and 9 inward upon one another, secure them by the pin 14 and then swing them on the pin 29 as a pivot, the spaces between the two couplings 4 and 5 receiving the handle and claw sections of the two bars 8 and 9 as will be readily understood. This arrangement of the unions or couplings, which is the preferred one, is shown in Fig. 1 of the drawings.

It will be obvious from the foregoing description of the construction of the parts of the device that the handle 7 is not only adjustable as to length to fold between the bars 2 and 3 of the standard 1, but such capability of adjustment permits it to be lengthened and shortened to suit the size of the room in which the carpet is to be stretched and to regulate the stroke or extent of movement of the handle for stretching a comparatively long strip or section of carpet, as occasion requires. When the parts are shortened to their extreme limit and arranged and secured between the bars 2 and 3 of the standard 1 the device will be folded compactly and may be stored in comparatively small space for shipment or storage in a warehouse, store or closet or other storage place in a residence in which it is employed for use.

From the foregoing description, taken in connection with the accompanying drawings, the construction and mode of operation of the invention will be understood without a further extended description.

Changes in the form, proportions and minor details of construction may be made within the scope of the invention without departing from the spirit or sacrificing any of the advantages thereof.

Having thus described the invention, what is claimed as new, is:—

A carpet stretcher comprising a standard composed of spaced members having permanently secured couplings at each end, said couplings formed of two sockets and a connecting plate, and placed reversely to each other, a handle provided with a claw at one end, an extension member upon the handle, means for adjusting the extension member horizontally and vertically relatively to the standard and means for locking it in its adjusted position.

In testimony whereof, I affix my signature in presence of two witnesses.

FRANK RICHARDSON.

Witnesses:
S. J. HENSLEY,
N. T. THAW, Jr.